P. BEIDL.
STEERING APPARATUS FOR FLYING MACHINES.
APPLICATION FILED OCT. 26, 1909.
997,733.
Patented July 11, 1911.
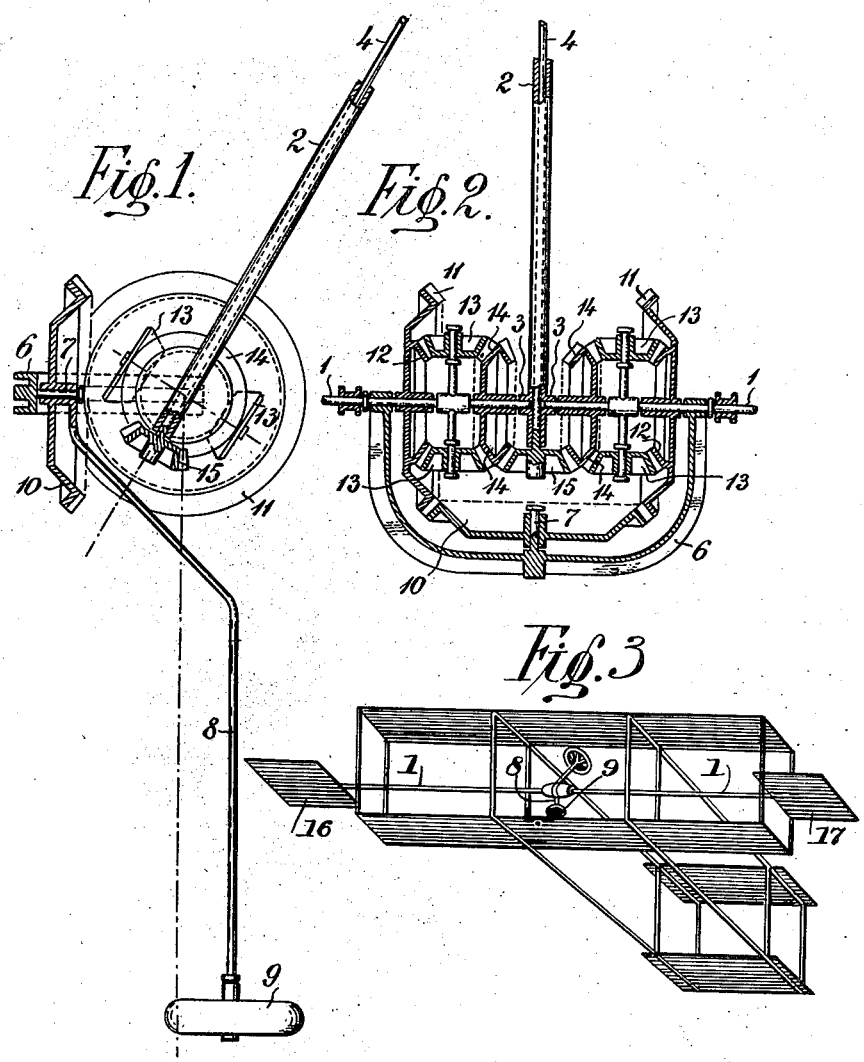
Witnesses
Chas. H. Smith
Geo. T. Pinckney
Inventor
Pius Beidl.
by Harold Serrell
his atty.

UNITED STATES PATENT OFFICE.

PIUS BEIDL, OF VIENNA, AUSTRIA-HUNGARY.

STEERING APPARATUS FOR FLYING-MACHINES.

997,733.  Specification of Letters Patent.  Patented July 11, 1911.

Application filed October 26, 1909. Serial No. 524,737.

*To all whom it may concern:*

Be it known that I, PIUS BEIDL, a subject of the Emperor of Austria-Hungary, residing at Vienna, Empire of Austria-Hungary, have invented certain new and useful Improvements in Steering Apparatus for Flying-Machines; and I do hereby declare the following to be a full, clear, and exact description of the invention, such as will enable others skilled in the art to which it appertains to make and use the same.

In the automatic steering or stabilizing apparatus heretofore known for flying machines, in which steering elements or surfaces are acted upon by a pendulum or the like hereinafter called the stabilizing element, such stabilizing element either acts upon separate steering elements independent from those which are under the control of the pilot or the stabilizing element also acts upon the steering elements controlled by the pilot. In the latter case, however, any adjustment of the steering elements effected by the pilot also brings about a change of position of the stabilizing element.

The object of my invention is to provide a steering apparatus for flying machines in which the steering device controlled by the pilot as well as the steering device operated by the stabilizing element always act on the same steering elements, the one steering device not interfering with the other, the automatic stabilizing element coming into operation only when the flying machine changes its position.

In the annexed drawings Figure 1 is a diagrammatical side elevation partly in section and Fig. 2 a similar plan partly in section illustrating by way of example one constructional form of my improved steering apparatus. Fig. 3 shows the arrangement of my improved steering apparatus in a flying machine.

1, 1 are two shafts in line with each other, their neighboring ends being journaled in sockets 3 on a tube 2. 4 is the steering rod passing longitudinally through and adapted to turn within such tube but prevented from sliding longitudinally therein; the rod 4 is also adapted to be locked, preferably automatically, in any position imparted to it by the pilot; the locking device, not shown, may be of any suitable construction; it may for instance consist of a pawl and ratchet gear or the like.

6 is a yoke freely suspended on the shafts 1 and 7 is a stud secured to the yoke; the geometrical axes of the stud 7 and the steering rod are in one vertical plane.

8 is a pendulum free to revolve around the stud 7 and carrying at its lower end a weight or gyroscope 9.

10 is a bevel wheel fast on the pendulum and free to revolve on the stud 7. The bevel wheel 10 engages into two bevel wheels 11, loosely mounted on the shafts 1, each of the bevel wheels 11 being fast to another bevel wheel, 12, which meshes into a bevel wheel 13, loosely mounted on a shaft fast on and intersecting at right angles the shaft 1. Each of the bevel wheels 13 meshes into one side of a double bevel wheel 14 loose on the shaft 1, the other side of the wheel 14 engaging into a bevel wheel 15 fast on the steering rod 4. As shown in Figs. 1 and 2 there is provided such a set of bevel gears 11, 12, 13, 14 on each of the shafts 1 and the two sets of bevel gears are symmetrically arranged relatively to the tube 2 and rod 4.

In Fig. 3 of the drawing I have shown the steering elements 16 and 17 connected to the outer ends of the shafts 1 1.

The operation of this apparatus is as follows: If the flying machine changes its position owing to any external force, then also the pendulum will change its position owing to the action of the weight or gyroscope 9. Supposing that in changing its position the flying machine turns through an angle around its longitudinal axis then the pendulum will turn under the action of gravity around the stud 7 and thus tend to turn the bevel wheels 13 through the medium of the bevel wheels 10, 11 and 12. But as the rod 4 is locked in its position as above stated and hence also the bevel wheel 15 fast on it and the wheels 14 engaging into the wheel 15 are prevented from revolving, therefore the wheels 13 on being turned by the pendulum will roll along the bevel wheels 14 whereby the shafts of the wheels and hence also the shafts 1 will be turned in opposite directions and by these shafts the steering elements 16 17 connected with them will be adjusted in opposite directions, so that they cause the flying machine to return into the position corresponding to the position of the steering rod 4. If on the other hand the flying machine in accidentally changing its position turns through an angle around its transverse axis, then the pendulum will swing in the plane passing through the geometrical axes of the stud 7 and the steering rod 4 and thereby turn the yoke 6 and the wheels 10, 11 and 12 around the shafts 1. The wheels 12 turn the wheels 13 and these roll along the wheels 14, the latter being locked owing to the fact that the steering rod 4 and therefore also the wheel 15 are locked in position. Thus the shafts 1 will be turned by the shafts of the wheels 13 but in this case the shafts 1 and the steering elements connected thereto are turned in the same direction. If the pilot wishes to use the apparatus for horizontal steering then he turns the rod 4 around its longitudinal axis whereby the wheels 14 are turned through the medium of the wheel 15. But as the wheels 14 mesh into the wheels 13 and the pendulum prevents the wheels 13 from revolving around their axis by means of the wheels 10, 11 and 12 the latter meshing with the wheels 13, therefore the wheels 13 must roll along the wheels 12 and thus cause the shafts 1 to turn in opposite direction. If the pilot wishes to use the apparatus for vertical steering he turns the rod 4 together with the tube 2 together with the wheels 15 and 14 around the shafts 1, the wheels 13 being prevented from revolving around the axes by the pendulum as above set forth, they must roll along the wheels 12 whereby both shafts 1 are turned in the same direction.

It is evident that after any steering or change of position of the flying machine caused by the pilot the automatic steering caused by the pendulum comes into effect through the differential gearing hereinbefore described and causes the shafts 1 to turn, so that the final position of the steering elements or surfaces is the resultant of the coöperation of the automatic steering action and the action brought about by the pilot independently of the former. If, however, the flying machine is accidentally thrown out of the position corresponding to the position of the steering rod the automatic steering comes into operation and tends to return the flying machine into the position corresponding to the position of the steering rod by adjusting the steering elements. Therefore by the present apparatus the flying machine is stabilized in any desired position.

Instead of the bevel wheel differential gear hereinbefore described by way of example, a friction gear might be used or the same effect might be obtained by a differential link and lever gear or a differential pulley gear.

Claims:

1. In a steering apparatus for flying machines the combination of steering elements, a steering rod and means, comprising shafts and differential gears connected therewith, for connecting such steering rod with the steering elements whereby the said steering elements are adjusted at the will of the operator, with a device mounted on the flying machine and adapted to locate itself in an invariable position in space automatically and independently of the position of the steering rod and with means coöperating with said differential gears whereby the steering elements are adjusted according to the position of such device relatively to the flying machine, substantially as and for the purpose described.

2. In a steering apparatus for flying machines the combination of two steering elements, two shafts in line with each other and each connected to one of the steering elements, a steering rod adapted to turn around the common axis of the said shafts and to turn around its own longitudinal axis, a wheel fast on the steering rod, a differential gear mounted on each of the said shafts, each such differential gear comprising an inner wheel and an outer wheel loose on the shaft and an idler wheel engaging with the said inner and the said outer wheel and loose on a stud fast on the shafts, the said wheel fast on the steering rod engaging with the inner wheels of both differential gears, a device mounted in the flying machine and adapted to locate itself in an invariable position in space automatically and independently of the position of the steering rod, such device being free to turn around a stud in a yoke loose on the said shafts, such stud being in one plane with the steering rod and a wheel fast on said device and in engagement with the outer wheels of the said differential gears, substantially as and for the purpose described.

In testimony whereof, I affix my signature in presence of two witnesses.

PIUS BEIDL.

Witnesses:
ARTHUR BAUMANN,
AUGUST FUGGER.